United States Patent
Weiss

(10) Patent No.: US 8,983,435 B2
(45) Date of Patent: Mar. 17, 2015

(54) SYSTEM AND METHOD FOR PROVIDING AN ALERT BASED ON USER LOCATION

(71) Applicant: Andrew Weiss, San Ramon, CA (US)

(72) Inventor: Andrew Weiss, San Ramon, CA (US)

(73) Assignee: WaveMarket, Inc., Emeryville, CA (US)

(*) Notice: Subject to any disclaimer, the term of this patent is extended or adjusted under 35 U.S.C. 154(b) by 63 days.

(21) Appl. No.: 13/647,336

(22) Filed: Oct. 8, 2012

(65) Prior Publication Data

US 2014/0099921 A1 Apr. 10, 2014

(51) Int. Cl.
H04M 1/66 (2006.01)
H04W 4/02 (2009.01)
H04W 12/08 (2009.01)

(52) U.S. Cl.
CPC .............. *H04W 12/08* (2013.01); *H04W 4/023* (2013.01)
USPC ........................................................ 455/411

(58) Field of Classification Search
CPC .... H04W 4/023; H04W 4/025; H04M 1/7253
USPC ........... 455/456.1, 418, 406, 407, 414.1, 419, 455/450, 426.1, 553.1, 426.2, 434; 705/39; 380/258
See application file for complete search history.

(56) References Cited

U.S. PATENT DOCUMENTS

| | | | |
|---|---|---|---|
| 5,285,586 A | 2/1994 | Goldston et al. | |
| 6,437,696 B1 | 8/2002 | Lemelson et al. | |
| 6,701,234 B1 | 3/2004 | Vogelsang | |
| 6,819,258 B1 | 11/2004 | Brown | |
| 6,834,195 B2 | 12/2004 | Brandenberg et al. | |
| 6,873,850 B2 | 3/2005 | Dowling et al. | |
| 6,895,238 B2 | 5/2005 | Newell et al. | |
| 6,961,562 B2 | 11/2005 | Ross | |
| 6,985,696 B2 | 1/2006 | Bromham et al. | |
| 7,042,338 B1 | 5/2006 | Weber | |
| 7,046,147 B2 | 5/2006 | Stigall | |
| 8,145,240 B2 | 3/2012 | Roumeliotis et al. | |
| 8,428,623 B2 | 4/2013 | Roumeliotis et al. | |
| 8,447,279 B1* | 5/2013 | Peng et al. ................ | 455/414.1 |
| 8,830,054 B2 | 9/2014 | Weiss | |
| 2002/0116266 A1 | 8/2002 | Marshall | |
| 2002/0169539 A1* | 11/2002 | Menard et al. ................ | 701/200 |
| 2003/0216960 A1 | 11/2003 | Postrel | |
| 2004/0214584 A1 | 10/2004 | Marinier | |
| 2005/0282559 A1 | 12/2005 | Erskine et al. | |

(Continued)

OTHER PUBLICATIONS

C. Thompson, J. White, B. Dougherty, A. Albright, and D. C. Schmidt, "Using smartphones to detect car accidents and provide situational awareness to emergency responders.," in MOBILWARE'10, (Chicago, IL, USA), pp. 29-42, 2010.

*Primary Examiner* — Kiet Doan
(74) *Attorney, Agent, or Firm* — Dovas Law, P.C.

(57) ABSTRACT

A computer-implemented method of providing an alert based on user location. An indication of a second user is received from a first user. It is determined whether the first user and the second user are co-members of a telecommunication carrier service plan. Location information of the first user and location information of the second user is received. A distance between the first user and the second user is determined based on the location information of the first user and the location information of the second user. The first user is alerted responsive to the distance between the first user and the second user exceeding a predetermined threshold. A system for providing an alert based on user location or user motion state is also provided.

22 Claims, 13 Drawing Sheets

(56) References Cited

U.S. PATENT DOCUMENTS

| | | |
|---|---|---|
| 2006/0009234 A1 | 1/2006 | Freer |
| 2006/0089878 A1 | 4/2006 | Roberts et al. |
| 2006/0135120 A1 | 6/2006 | Likourezos |
| 2007/0100595 A1 | 5/2007 | Earles et al. |
| 2007/0142068 A1 | 6/2007 | Matsuo |
| 2007/0282678 A1 | 12/2007 | Dendi et al. |
| 2008/0077489 A1 | 3/2008 | Gilley et al. |
| 2008/0119207 A1 | 5/2008 | Harris |
| 2008/0146250 A1 | 6/2008 | Aaron |
| 2008/0153511 A1 | 6/2008 | Mock |
| 2008/0242311 A1* | 10/2008 | Craine et al. ............... 455/456.1 |
| 2010/0007503 A1 | 1/2010 | Carrington |
| 2010/0113013 A1 | 5/2010 | Karabinis et al. |
| 2010/0241496 A1 | 9/2010 | Gupta et al. |
| 2011/0250904 A1* | 10/2011 | Valletta et al. ............. 455/456.1 |
| 2011/0294457 A1 | 12/2011 | Braznell |
| 2012/0072340 A1* | 3/2012 | Amron ........................... 705/39 |
| 2012/0142379 A1 | 6/2012 | Park |
| 2012/0196538 A1 | 8/2012 | Mateu |
| 2012/0258740 A1 | 10/2012 | Mildh et al. |
| 2013/0021788 A1 | 1/2013 | Mayes |
| 2013/0177006 A1* | 7/2013 | Baek et al. .................... 370/338 |
| 2014/0099972 A1 | 4/2014 | Weiss |
| 2014/0148192 A1 | 5/2014 | Hodges et al. |
| 2014/0180438 A1 | 6/2014 | Hodges et al. |

* cited by examiner

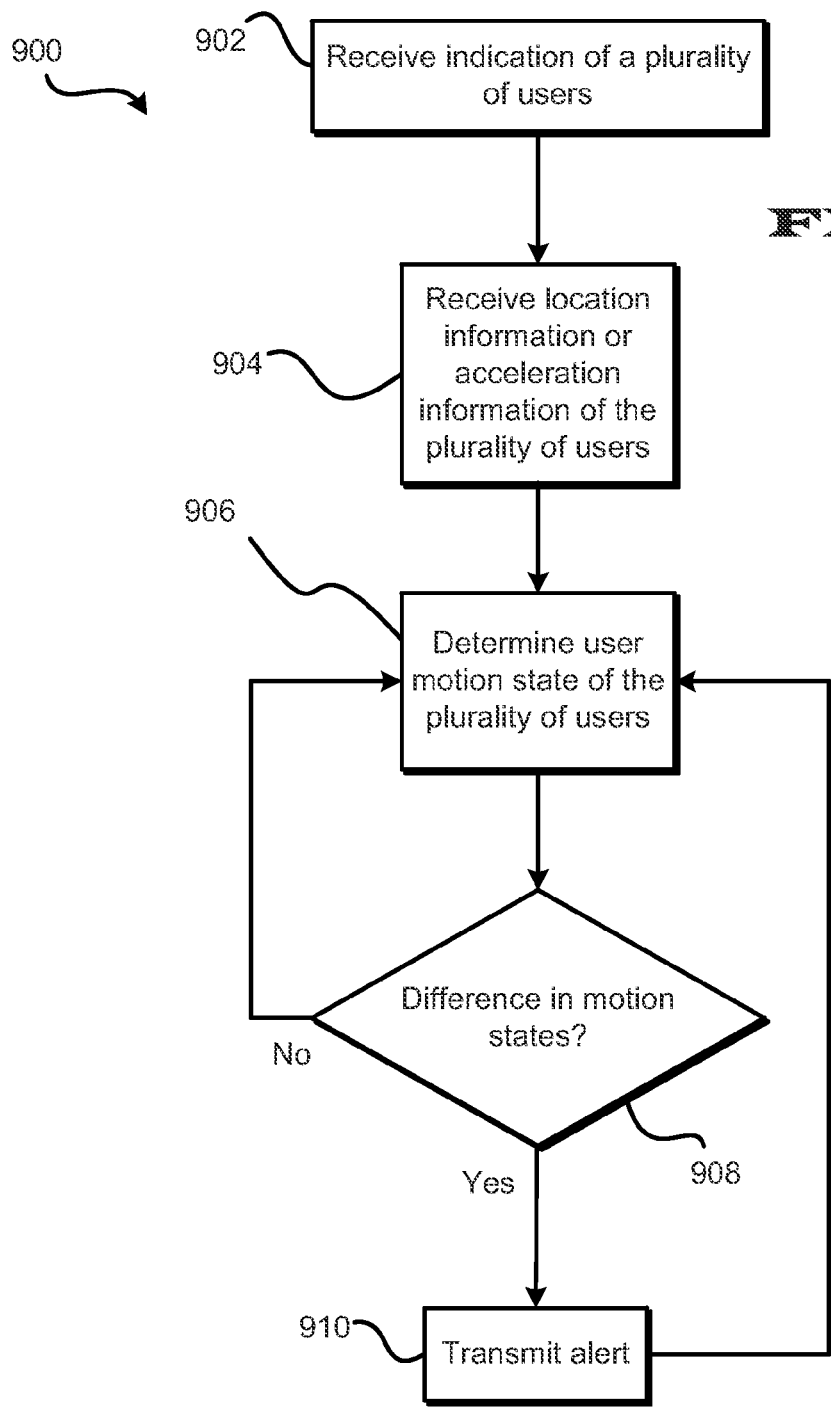

SYSTEM AND METHOD FOR PROVIDING AN ALERT BASED ON USER LOCATION

BACKGROUND

There is a segment of the population which would benefit from location monitoring. Location monitoring may be particularly beneficial to children, the elderly, the disabled, and those recovering from surgery or recent trauma, especially when such persons are not located in a facility that provides appropriate patient supervision. Children for example may be more likely to encounter hazardous situations and become victims of illegal activity.

Personal mobile devices such as personal computers, tablets, and smart phones have gained widespread use over a relatively short period of time. Such devices are so common that they are approaching commodity status. Most mobile devices rely on a major network operator ("carrier") to provide basic communications, texting, and support for wireless data and internet access. Many carrier subscribers participate in what are known as "family plans"—families or groups of individuals that enter into a joint billing contract with a carrier. Because of the joint billing contract, simply being in a family plan tends to be indicative of a family relationship or the existence of an otherwise close and trusting relationship.

One reason for the widespread use of personal mobile devices is parents obtaining such devices for their children to use. While parents may purchase personal mobile devices for their children for many different reasons, one very common reason is to implement a communication "lifeline"—an always available and always open channel that provides direct communications between family members, particularly between the parent and child. The availability of such lifelines has motivated parents to obtain personal mobile devices for children of younger and younger ages.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer-implemented method of providing an alert based on user location is provided. The method includes receiving from a first user an indication of a second user and determining whether the first user and the second user are co-members of a telecommunication carrier service plan. Location information of the first user and location information of the second user are received. A distance between the first user and the second user is determined based on the location information of the first user and the location information of the second user, and the first user is alerted responsive to the distance between the first user and the second user exceeding a predetermined threshold.

Further provided is a computer-implemented method of providing an alert based on user location including receiving from a first user an indication of a second user and transmitting a request to at least one of the second user and a party authorized to respond on behalf of the second user for an authorization to access location information of the second user. The authorization to access the location information of the second user is received from at least one of the second user and the party authorized to respond on behalf of the second user, and location information of the second user is received responsive to receiving the authorization. The location information of the second user and location information of another user are compared to determine a relative position of the second user with respect to the other user, and the first user is alerted based on the relative position.

Further provided is a computer-implemented method of providing an alert based on user location including receiving from a first user an indication of a plurality of users including at least three users and receiving location information of the plurality of users. Distances are determined between the plurality of users based on the location information of the plurality of users, and the first user is alerted responsive to the distances between at least one of the plurality of users and at least two other of the plurality of users exceeding a predetermined threshold.

Further provided is a method of providing an alert based on user location including receiving from a first user an indication of a plurality of users and receiving location information of the plurality of users. Distances are determined between the plurality of users based on the location information of the plurality of users, and the first user is alerted responsive to the distance between any at least one of the plurality of users and the nearest other of the plurality of users exceeding a predetermined threshold.

Further provided is a computer-implemented method of providing an alert based on user location including receiving from a first user an indication of a plurality of other users and receiving location information including geographic positions of the plurality of other users. A coordinate is determined based on the geographic positions of the plurality of other users. Distances are determined between the coordinate and the plurality of other users, and the first user is alerted responsive to the distance between the coordinate and at least one of the plurality of other users exceeding a predetermined threshold.

Further provided is a computer-implemented method of providing an alert based on user location including receiving from a first user an indication of a plurality of users including at least three users and determining a plurality of groupings of the plurality of users, wherein each grouping comprises at least two of the plurality of users. Location information of the plurality of users is received. At least one distance between users in each of the plurality of groupings is determined based on the location information of the plurality of users, and the first user is alerted responsive to the distance between at least two users in a grouping exceeding a predetermined threshold.

Further provided is a computer-implemented method of providing an alert based on user location including receiving from a first user an indication a second user and a third user. A designation of the second user is received from the first user. Location information of the second user and the third user is received and a distance between the second user and the third user is determined based on the location information. The second user is alerted responsive to the designation and responsive to the distance between the second user and the third user exceeding a predetermined threshold.

Further provided is a computer-implemented method of providing an alert based on user location including receiving from a first user an indication of a plurality of users including at least two users and receiving location information of the plurality of users. At least one distance between the plurality of users is determined based on the location information of the plurality of users, and the first user is alerted responsive to the distances between at least one of the plurality of users and at least one other of the plurality of users being less than a predetermined threshold.

Further provided is a computer-implemented method of providing an alert based on user motion states. The method includes receiving an indication of a plurality of users comprising at least two users and receiving at least one of location information and acceleration information of the plurality of users. User motion states of the plurality of users are determined based on the at least one of the location information and the acceleration information of the plurality of users, and an alert is provided responsive to the user motion state of at least one of the plurality of users differing from the user motion state of at least one other of the plurality of users.

Further provided is a system including a non-transitory computer readable storage medium having encoded thereon instructions that, when executed on a processor of the system, cause the system to perform a process including receiving from a first user an indication of a second user and determining whether the first user and the second user are co-members of a telecommunication carrier service plan. The process further includes receiving location information of the first user and location information of the second user, determining a distance between the first user and the second user based on the location information of the first user and the location information of the second user, and alerting the first user responsive to the distance between the first user and the second user exceeding a predetermined threshold.

Further provided is a non-transitory computer-readable media tangibly embodying a program of instructions executable by a computing device to implement a method, the computing device being capable of interfacing with a communications network, the method comprising receiving from a first user an indication a second user and a third user and receiving from the first user a designation of the second user. The method further comprises receiving location information of the second user and the third user, determining a distance between the second user and the third user based on the location information, and alerting the second user responsive to the designation and responsive to the distance between the second user and the third user exceeding a predetermined threshold.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 2-10 are diagrams showing methods for providing alerts.

Figure 1:
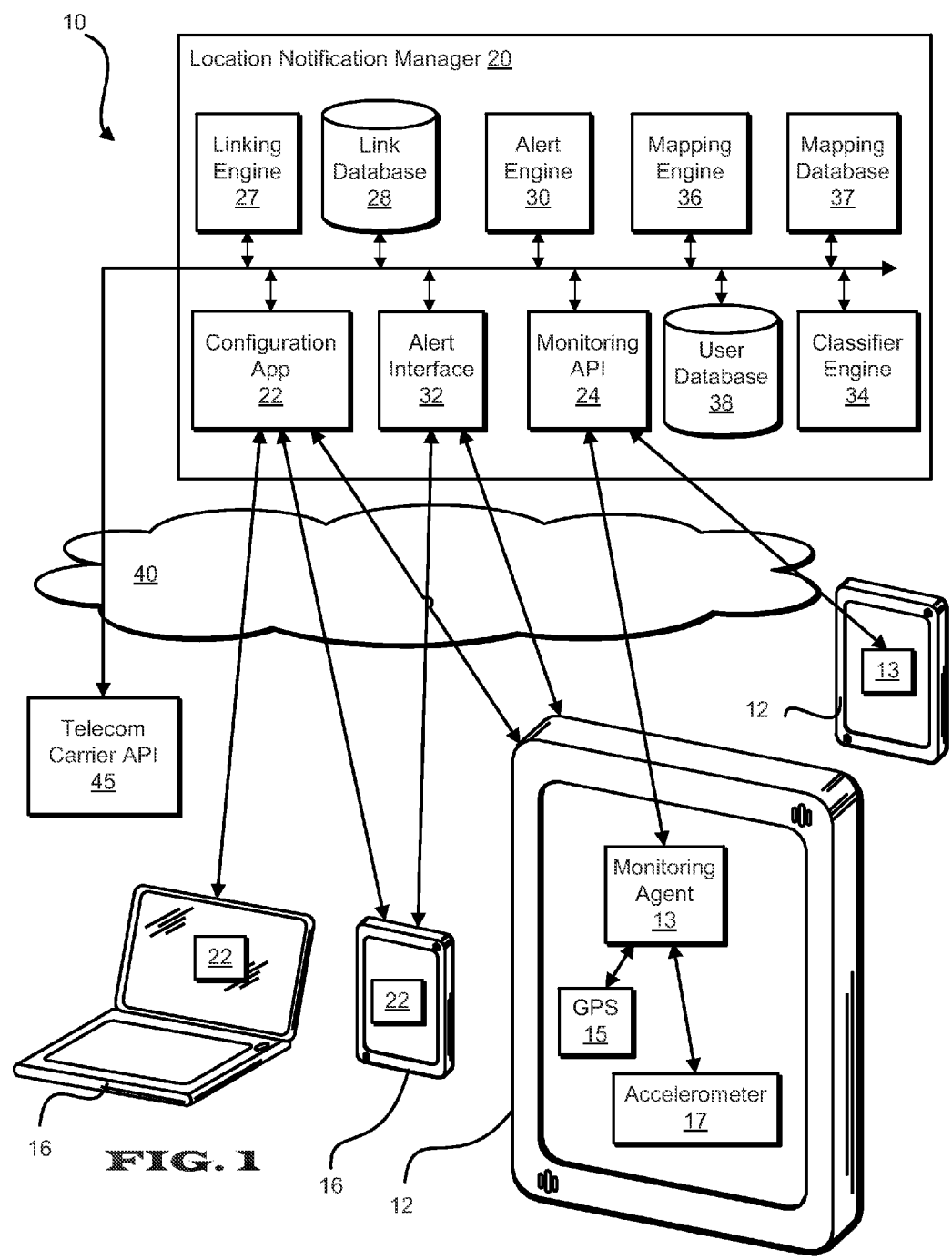
FIG. 1 shows a system for providing a location alert.

FIGS. 12A, 12B, 13A, and 13B show aerial plan views of users illustrating an application of an alert method.

DETAILED DESCRIPTION OF ILLUSTRATIVE EMBODIMENT(S)

Embodiments are described below with reference to the drawing figures where like numerals represent like elements throughout.

Referring to FIG. 1, a system 10 is provided including a location notification manager 20 used for providing notification regarding a particular user's location to another user. The location notification manager 20 ("notification manager") enables a configuration application 22, a monitoring application program interface ("API") 24, a link database 28, an alert engine 30, an alert interface 32, a classifier engine 34, a mapping engine 36 connected to a mapping database 37, and a user database 38. The notification manager 20 can be implemented on one or more network accessible computing systems in communication via a network 40 with one or more wireless mobile communication devices 12 which correspond to a monitored user and are monitored via a monitoring agent 13. Alternatively, the notification manager 20 or one or more components thereof can be executed on the monitored mobile communication device 12 or other system. The configuration application 22 includes a web application or other application enabled by the notification manager 20 and accessible to a client device 16 via a network and/or executed by the client device 16.

Software and/or hardware residing on a monitored mobile communication device 12 enables the monitoring agent 13 to provide location information to the notification manager 20 via the monitoring API 24. The mobile device 12 can include for example a smartphone or other cellular enabled mobile device preferably configured to operate on a wireless telecommunication network, for example an article of clothing such as a pair of shoes. In addition to components enabling processing and wireless communication, the mobile device 12 includes a location determination system, such as a global positioning system (GPS) receiver 15 from which the monitoring agent 13 gathers data used for determining user location. The mobile device 12 can also be provided with an accelerometer 17 to provide additional data regarding user motion. A monitored user carries the mobile device 12 on their person with the monitoring agent 13 active.

Acceleration data from an accelerometer 17 and position, time and velocity data from the GPS receiver 15 can be resolved to predict a user motion state by executing a classifier on the mobile device 12, for example via the monitoring agent 13, or by executing the classifier on a remote system in communication with the mobile device 12 through a network, for example via the classifier engine 34 of the location notification manager 20. The user motion state corresponds to a determined mode of transportation of a user, for example walking, bicycling, or riding in a motor vehicle. The classifier includes an algorithm for identifying the states to which new observations belong, where the identity of the states is unknown. The classifier is trained prior to implementation based on received training data including observations corresponding to known motion states and can be continually retrained based on new data to enable a learning process.

Figure 2:
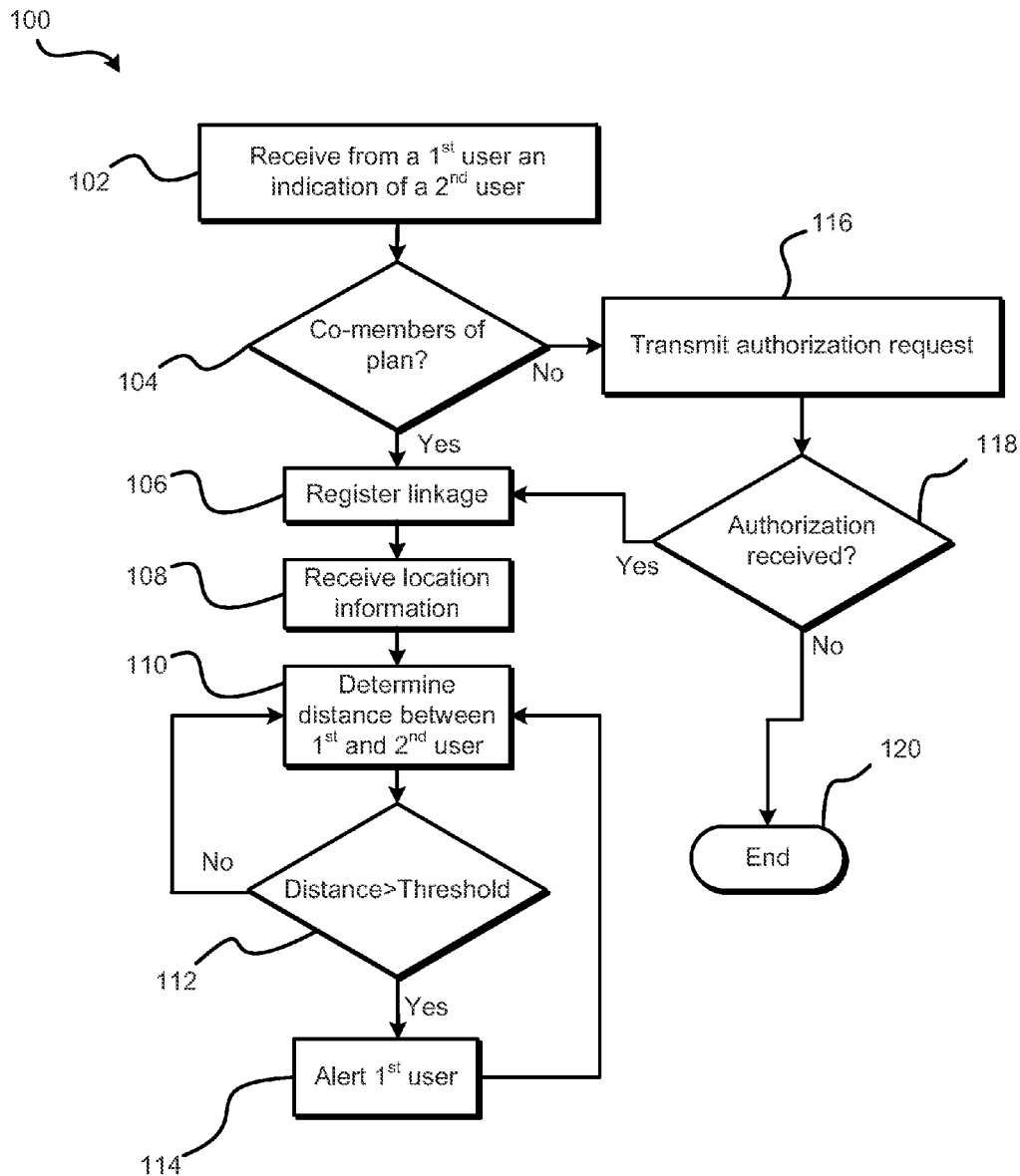

Referring to FIG. 2, a method 100 for providing an alert based on user location is shown. The method or process 100 is described with reference to the components shown in the system 10 of FIG. 1, including the notification manager 20 and monitoring agent 13, which are preferably configured for performing the method 100 and include or have access to suitable non-transitory data storage including instructions for performing the method. The method 100 may alternatively be performed via other suitable systems. The notification manager 20 receives from a first user an indication of a second user (step 102). The first user can provide the indication via the configuration application 22 using a client device 16, and the indication can be provided in the form of a request to monitor location of the second user. It is determined whether the first user and the second user are co-members of a telecommunication carrier service plan (e.g. members the same "family plan") (step 104). This can be performed through a query to a user database 38 or a telecommunication carrier system via an application program interface ("API") 45. If they are co-members, a linkage is registered between the first user and the second user (step 106), and location information of the first user and location information of the second user is received (step 108), for example via the monitoring agent 13 on the mobile device 12. A distance is determined between the first user and the second user based on the location information of the first user and the location information of the second user (step 110), for example via the mapping engine 36. The determined distance is compared with a predetermined threshold distance (step 112). The first user is alerted responsive to the distance between the first user and the second user exceeding a predetermined threshold (step 114), and the process continues to step 110. An alert is produced by the alert engine 30 and provided to the first user's client device 16 via an alert interface 32.

As shown, the steps of receiving the location information (step 108), determining the distance (step 110), and alerting the first user (step 114) are performed if the first user and the second user are determined to be co-members of the telecommunication carrier service plan (step 104). Alternatively, less than all of the steps 108, 110 and 114 can be performed responsive to determining the first and second users are co-members of a service plan. For example, alternatively location information may be collected and distance can be determined before determining the first user and the second user are co-members of a plan, but the alert is only provided if it is determined the first and second users are co-members of a plan. Further, additional criteria may be required to be met prior to receiving the location information (step 108), determining the distance (step 110), and alerting the first user (step 114). For example, it may be required that the first user is also an authorized administrator of the plan such as the account payer to permit the first user access to the second user's location information.

If the first and second users are determined not to be co-members of a telecommunication carrier service plan, a request is transmitted to the second user or a party authorized to respond on behalf of the second user for an authorization to access location information of the second user (step 116). Thereafter, the steps of registering the linkage, receiving the location information, determining the distance, and alerting the first user, or alternatively one or more of these steps, are performed responsive to receiving the authorization (step 118) from the second user or a party authorized to respond on behalf of the second user. If no authorization is received, the method 100 ends (step 120).

The notification manager 20 can further receive from the first user an indication of a plurality of users, wherein it is determined whether the first user and each of the plurality of users are co-members of a telecommunication carrier service plan, and for each of the plurality of users which are co-members with the first user, a linkage is registered between the first user and the particular one of the plurality of users ("linked user"). Steps recited above are repeated for each linked user. Location is determined for each linked user, distance is determined between the first user and each linked user, and the first user is alerted responsive to distance between the first user and any one or more of the linked user's distance from the first user exceeding a predetermined threshold.

In the method 100 and the methods which follow, location is determined dynamically. As users move position over time, the determined distances between the users change. The notification manager 20 is configured to dynamically determine distances as users change position. In the method 100 and the methods which follow, a determined distance which is compared with a predetermined threshold can be a straight line distance, wherein for example the first user's position serves as the origin of a radius, and a second user by moving outside of the radius defined by the first user's position triggers an alert. Alternatively, the distance between users used for comparison with a threshold can be a distance along available routes between the users defined by the mapping engine 36 based on maps obtained via a mapping database 37 or other local or network accessible database or system. For example, the distance along available routes between two users may be significantly greater than the straight line distance between the users.

Figure 11A:
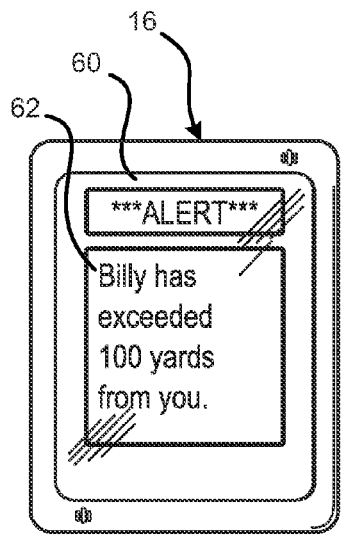
FIGS. 11A-11F show example alert screen displays.

In an example implementation of the method 100, the first user can correspond to a caretaker such as a parent operating the client device 16, and the second user can correspond to a child operating the mobile device 12 who the caretaker oversees. The caretaker can submit a request via the configuration application 22 to link the child's mobile device 12 to the caretaker's mobile device (e.g. client device 16). The notification manager 20 queries the telecommunication carrier API 45 or other accessible system to determine whether the caretaker and child are members of the same family plan and to determine whether the caretaker is an authorized administrator of the plan, which information can be stored for later use in the user database 38. If it is determined that the caretaker and child are members of the same family plan and that the caretaker is an authorized administrator of the family plan, a linkage between the caretaker's mobile device 16 and the child's mobile device 12 is registered and stored in the link database 28. If it is determined that the child's mobile device 12 does not correspond to any formal agreement (e.g. a family plan) with the caretaker or that the caretaker is otherwise not authorized via his telecommunication carrier to initiate location monitoring of the child's mobile device 12, a request is made to the child's mobile device 12 or to a network accessible system operated by a user responsible for the child (e.g. a client device 16) to provide the requisite authorization. If the recipient accepts the request by providing authorization, the linkage is registered and the system monitors location of the child's mobile device 12. When the monitored child's location exceeds a predetermined distance from the caretaker as determined by the mapping engine 36, the notification manager 20 provides an alert to the caretaker on their client device 16 via the alert interface 32. Referring to FIG. 11A, an example alert 62 pursuant to the method 100 for a child named Billy reads "Billy has exceeded 100 yards from you", as shown on a screen display 60 of a caretaker's client device 16.

Figure 3:
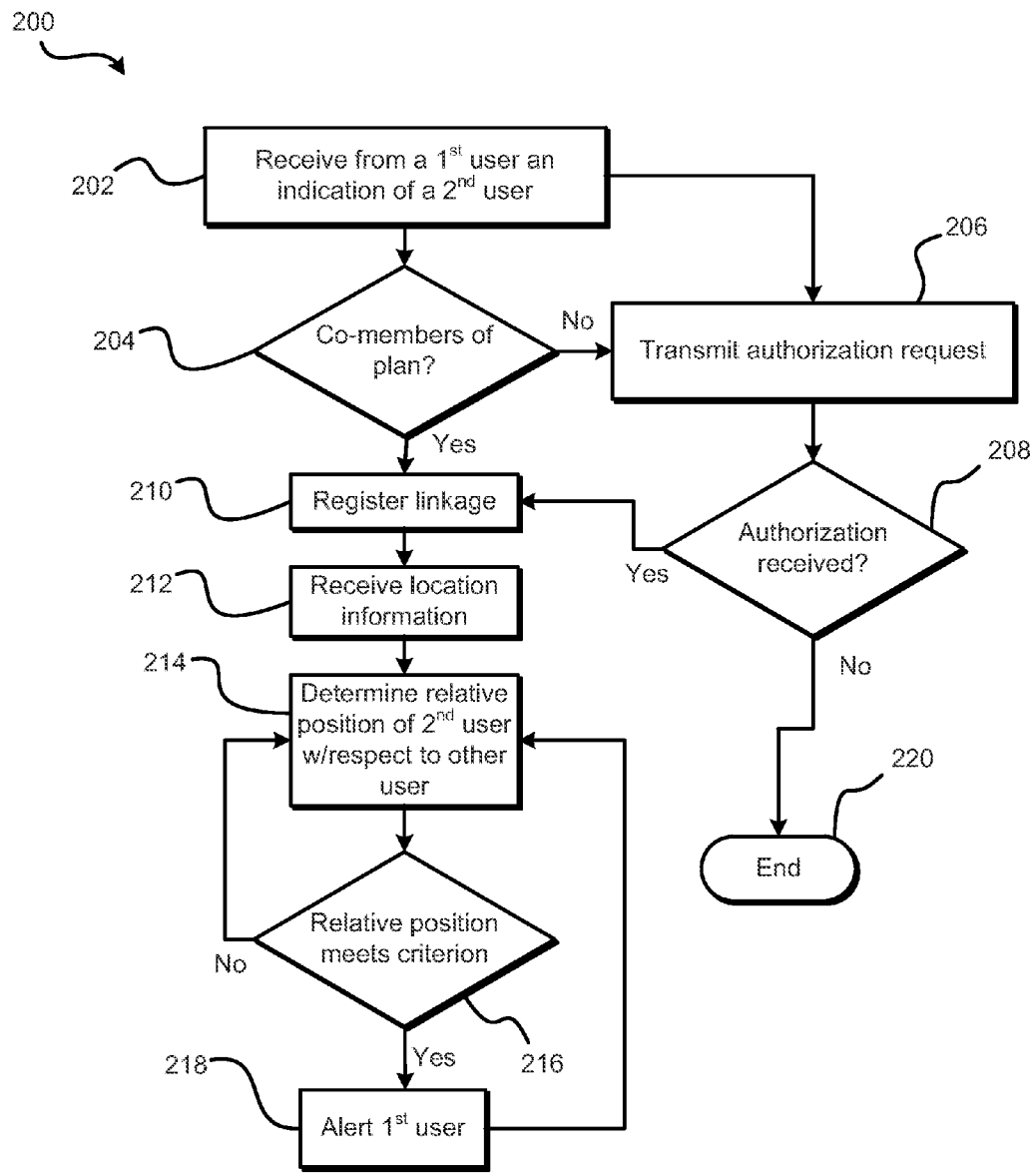

Referring to FIG. 3, a method 200 for providing an alert based on user location is shown. The method 200 is described with reference to the components shown in the system 10 of FIG. 1, including the notification manager 20 and monitoring agent 13, which are preferably configured for performing the method 200 and include or have access to suitable non-transitory data storage including instructions for performing the method. The method 200 may alternatively be performed via other suitable systems. The notification manager 20 receives from a first user an indication of a second user (step 202). The notification manager 20 determines whether the first user and the second user are co-members of a telecommunication carrier service plan (step 204) and whether the first user is authorized to obtain location of the second user if they are co-members. The notification manager 20 transmits an authorization request (step 206) responsive to determining the first user and the second user are not co-members of a telecommunication carrier service plan, or responsive to determining the first user is not authorized to obtain location of the second user regardless of whether the first and second users are co-members of a telecommunication carrier service plan.

The request (step 206) is transmitted to the second user or a party authorized to respond on behalf of the second user for an authorization to access location information of the second user. The request can be transmitted from the notification manager 20 via the alert interface 32 to a mobile device 12 of the second user. Authorization can be received from the second user or the party authorized to respond on behalf of the second user (step 208) via the configuration application 22. If authorization is provided (step 208), a linkage between the first user and the second user is registered (step 210) and location information of the second user is received (step 212), for example by the monitoring API 24 via the monitoring agent 13 executed on the mobile device 12, which obtains location information via a GPS 15 or other location determining system. The location information of the second user is compared with location information of another user to determine a relative position of the second user with respect to the other user (step 214), for example via the mapping engine 36. The first user is alerted based on the relative position of the second user meeting a predetermined criterion (steps 216, 218), for example if the second user exceeds a predetermined distance from the other user. The other user can be the first user, or alternatively, a third user. If no authorization is received in step 208, the process 200 ends at step 220.

Figure 11B:
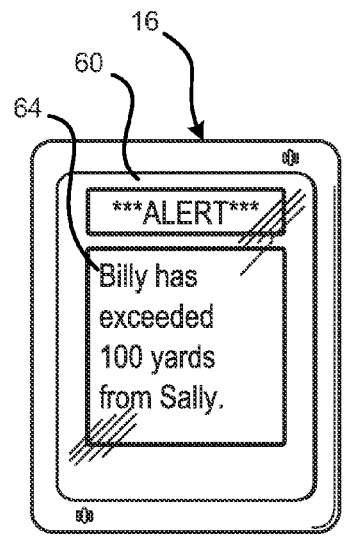

In an example embodiment of the method 200, the first user can correspond to a parent operating the client device 16, and the second user can correspond to a friend of a child of that parent who may be accompanying the parent, the child, and other family members on an outing. By the method 200, the parent is enabled to send to the child's friend via the friend's mobile device 12 or to the friend's parent a request to allow the notification manager 20 access to the location information originating from the friend's mobile device 12. In such a manner, the friend's mobile device 12 can be linked to the parent's mobile device 16, or alternatively the parent's child's mobile device 12, and an alert can be provided by the alert engine 30 via the alert interface 32 if the friend exceeds a predetermined distance from the parent, or alternatively, the child. Referring to FIGS. 11A and 11B, examples alert 62, 64 pursuant to the method 200 for a child named Billy respectively reads "Billy has exceeded 100 yards from you" or "Billy has exceeded 100 yards from Sally", as shown on a screen display 60 of a caretaker's client device 16.

Figure 4:
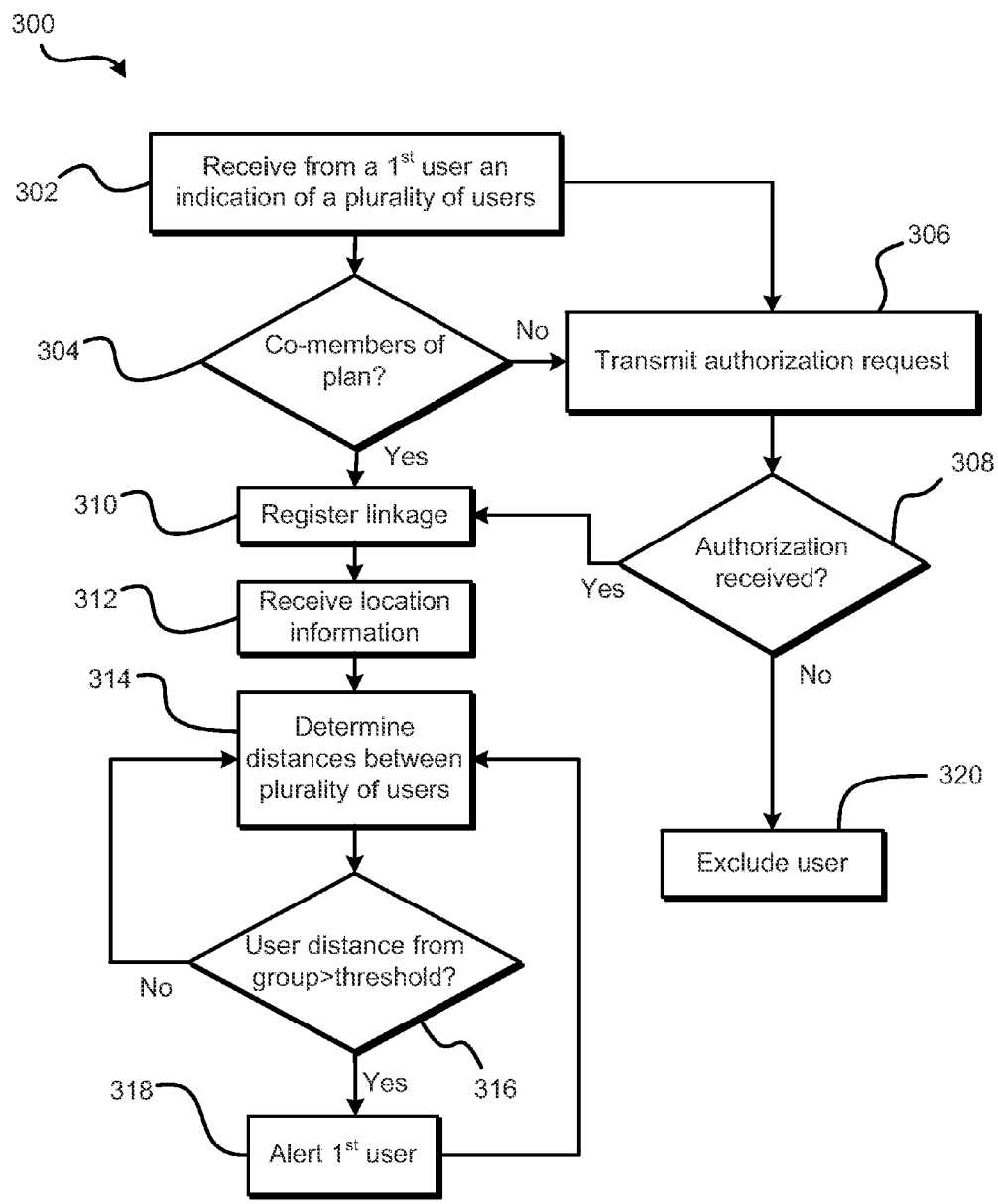
Figure 11C:
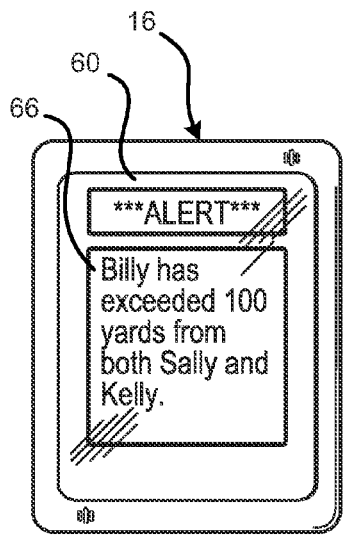

Referring to FIG. 4, a method 300 for providing an alert based on user location is shown. The method 300 is described with reference to the components shown in the system 10 of FIG. 1, including the notification manager 20 and monitoring agent 13, which are preferably configured for performing the method 300 and include or have access to suitable non-transitory data storage including instructions for performing the method. The method 300 may alternatively be performed via other suitable systems. The notification manager 20 receives from a first user an indication of a plurality of users including at least three users (step 302) via the configuration application 22. For each of the plurality of users a linkage with the first user is registered (step 310) if it is determined they are co-members of a plan (step 304), or if responsive to an authorization request (step 306), appropriate authorization is received (step 308) from such user or a party permitted to authorize on such user's behalf. If a particular user is not a co-member with the first user and no authorization is received, the particular user is excluded from registration and location monitoring (step 320) and the process continues for other users. Location information of the plurality of registered users is received (step 312), for example using the monitoring API 24 via the monitoring agent 13 executed on the mobile device 12. Distances are determined between the plurality of users based on the location information of the plurality of users, for example via the mapping engine 36 (step 314). The first user is alerted via the alert interface 32 responsive to the distances between any at least one of the plurality of users and two or more other (e.g. two other users or all other users) of the plurality of users exceeding a predetermined threshold (steps 316, 318). In an example implementation of the method 300, a parent first user is assisted in determining whether a plurality of child users under her care stay grouped together during an outing or whether one or more children veer away from the group. Referring to FIG. 11C, an example alert 66 pursuant to the method 300 for a child named Billy reads "Billy has exceeded 100 yards from both Sally and Kelly", as shown on a screen display 60 of a caretaker's client device 16.

Figure 5:
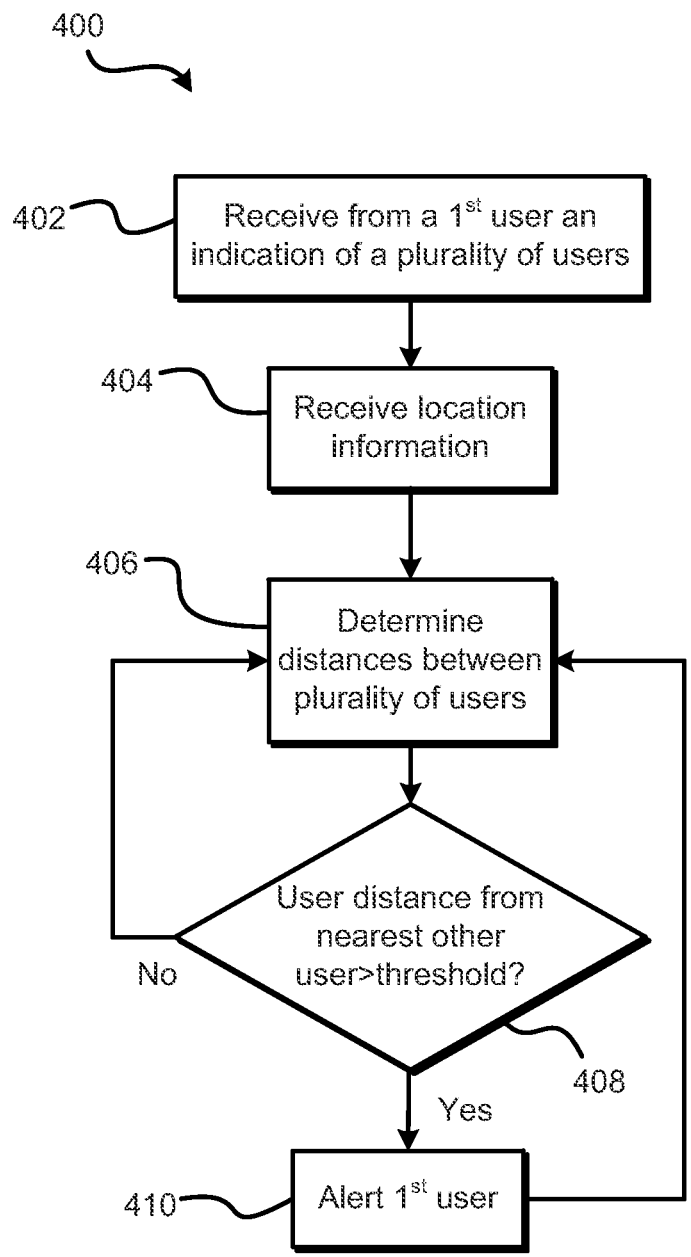
Figure 11D:
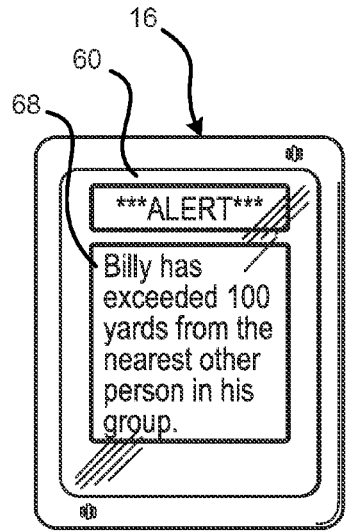

Referring to FIG. 5, a method 400 for providing an alert based on user location is shown. The method 400 is described with reference to the components shown in the system 10 of FIG. 1, including the notification manager 20 and monitoring agent 13, which are preferably configured for performing the method 400 and include or have access to suitable non-transitory data storage including instructions for performing the method. The method 400 may alternatively be performed via other suitable systems. The notification manager 20 receives from a first user an indication of a plurality of users (step 402) via the configuration application 22. If the first user is authorized, for example as described above in method 300 with reference to steps 304, 306, 308, 310 and 320, location information of the plurality of users is received (step 404), for example using the monitoring API 24 via the monitoring agent 13 executed on the mobile device 12. Distances are determined between the plurality of users based on the location information of the plurality of users (step 406), for example via the mapping engine 36. The first user is alerted via the alert interface 32 responsive to the distances between any one of the plurality of users and the nearest other of the plurality of users exceeding a predetermined threshold (steps 408, 410). In which case, such any one of the plurality of users would be positioned a distance greater than the threshold from all of the plurality of users. In an example implementation of the method 400, a parent first user is assisted in determining whether a plurality of child users under her care stay grouped together during an outing or whether one or more children veer away from the group. Referring to FIG. 11D, an example alert 68 pursuant to the method 400 for a child named Billy reads "Billy has exceeded 100 yards from the nearest other person in his group", as shown on a screen display 60 of a caretaker's client device 16.

Figure 6:
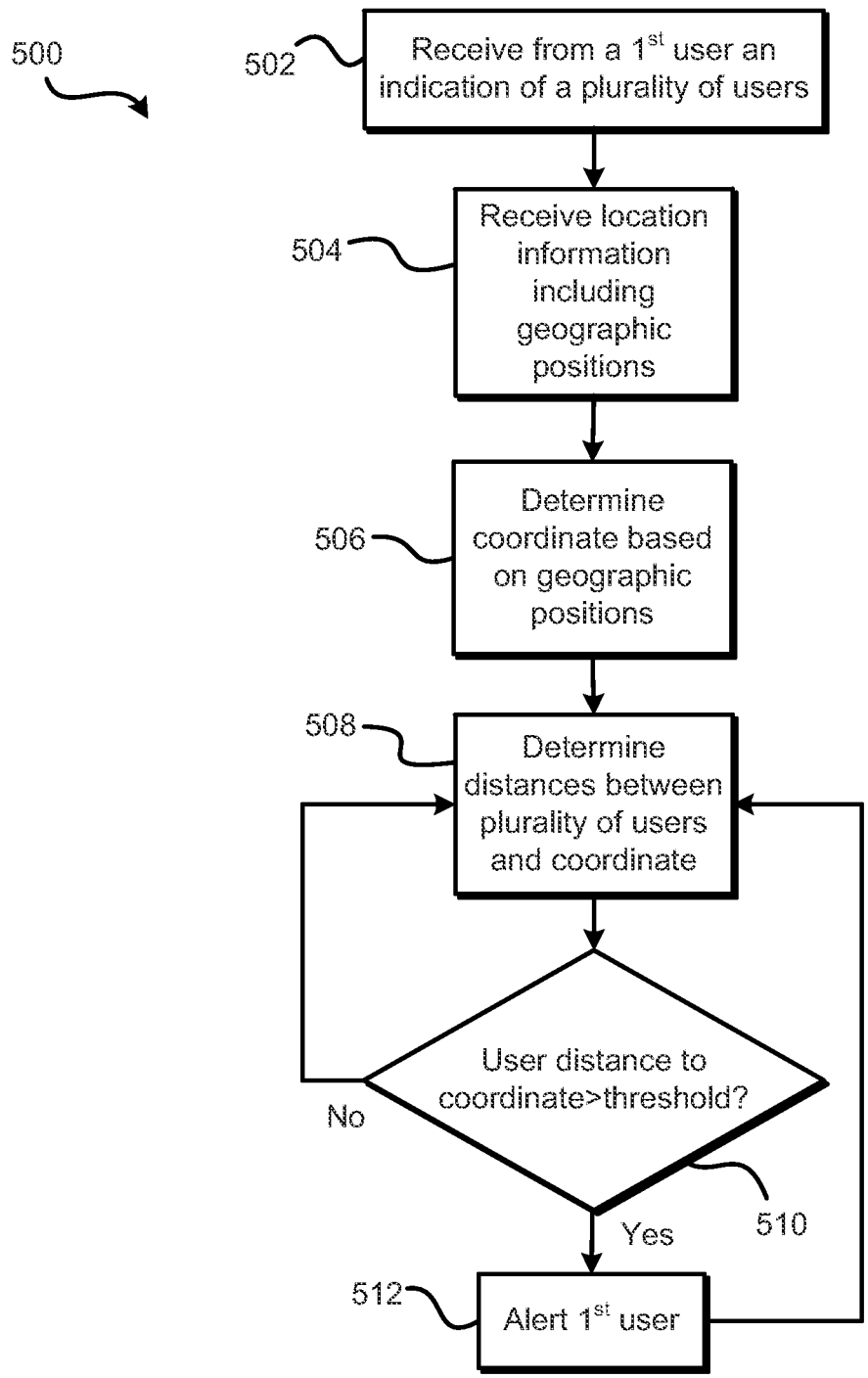
Figure 11E:
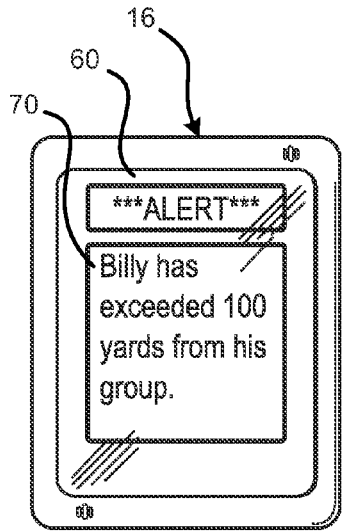

Referring to FIG. 6, a method 500 for providing an alert based on user location is shown. The method 500 is described with reference to the components shown in the system 10 of FIG. 1, including the notification manager 20 and monitoring agent 13, which are preferably configured for performing the method 500 and include or have access to suitable non-transitory data storage including instructions for performing the method. The method 500 may alternatively be performed via other suitable systems. The notification manager 20 receives from a first user an indication of a plurality of other users (step 502) via the configuration application 22. If the first user is authorized, for example as described above in method 300 with reference to steps 304, 306, 308, 310 and 320, location information including geographic positions of the plurality of other users is received (step 504), for example using the monitoring API 24 via the monitoring agent 13 executed on the mobile device 12. A coordinate is determined based on the geographic positions of the plurality of other users (step 506). The coordinate is preferably a centroid of the geographic positions. Distances are determined between the coordinate and the plurality of users, for example via the mapping engine 36 (step 508). The first user is alerted via the alert interface 32 responsive to the distance between one or more of the plurality of users and the coordinate exceeding a predetermined threshold (steps 510, 512). Referring to FIG. 11E, an example alert 70 pursuant to the method 500 for a child named Billy reads "Billy has exceeded 100 yards from his group", as shown on a screen display 60 of a caretaker's client device 16.

Figure 12A:
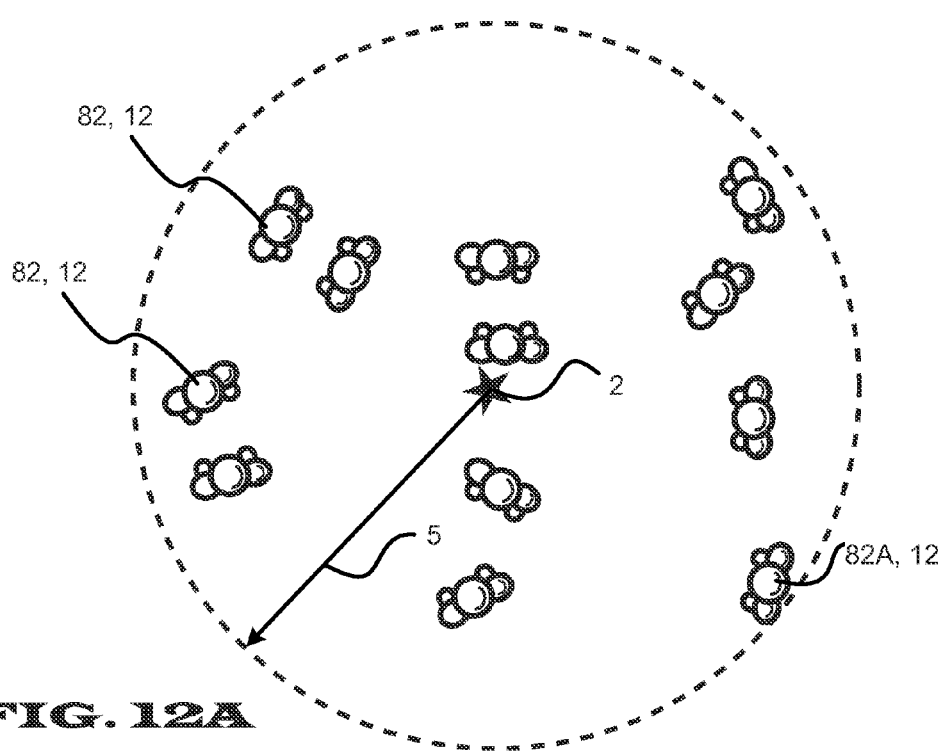
Figure 12B:
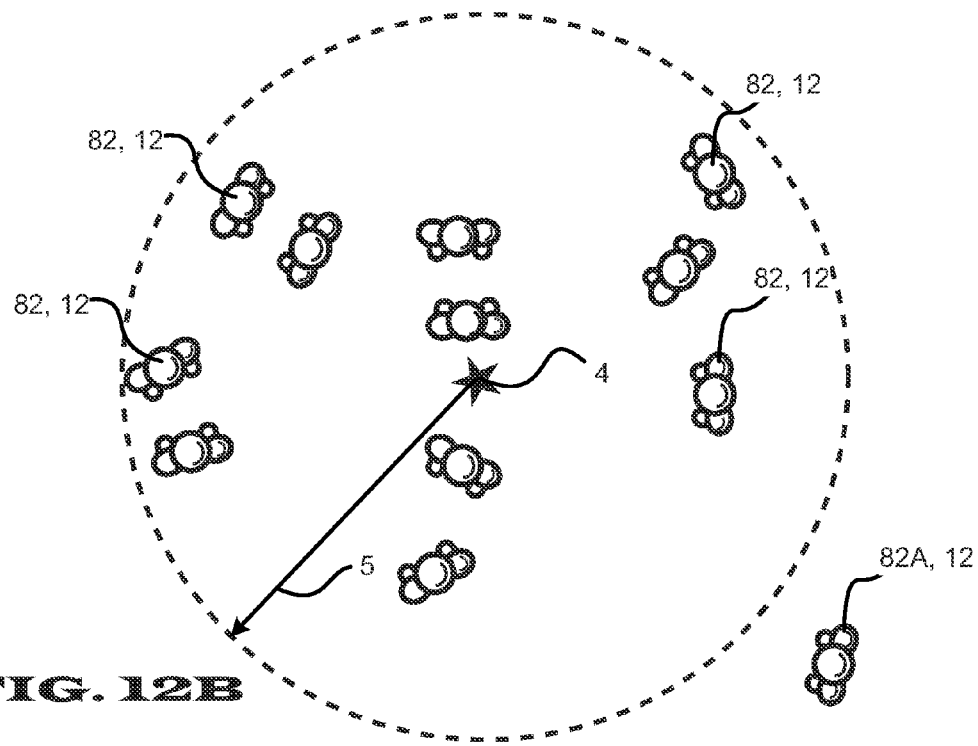

FIGS. 12A and 12B are aerial views of users showing an example implementation of the method 500. A group of registered monitored users 82 including a particular user 82A carry mobile devices 12 and are monitored via the location notification manager 20 and respective monitoring agents 13. A first centroid 2 is determined by the mapping engine 36 based on the positions of the users 82 at a first time period shown by FIG. 12A, and a second centroid 4 is determined by the mapping engine 36 based on user positions at a later second time period shown by FIG. 12B. In FIG. 12A at the first time period, all of the users 82 are shown within a predetermined distance 5 of the centroid 2. In FIG. 12B during the second time period, a particular one of the users 82A is shown positioned greater than the predetermined distance 5 from the centroid 4 causing an alert to be triggered by the notification manager 20.

As the plurality of users move position, the coordinate changes and the determined distances of the plurality of users from the coordinate change. A determined distance can be a straight line distance wherein a user outside of a radius defined by the coordinate will trigger the alert. Alternatively, the distance can be defined along available routes defined by the mapping engine 36 based on maps obtained via a mapping database 37 or other local or network accessible database or system.

Figure 13A:
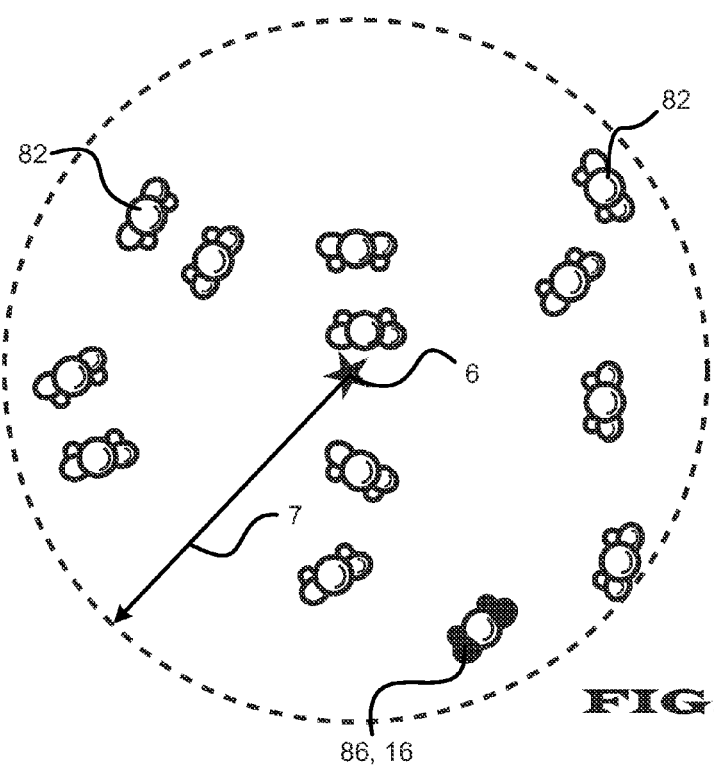
Figure 13B:
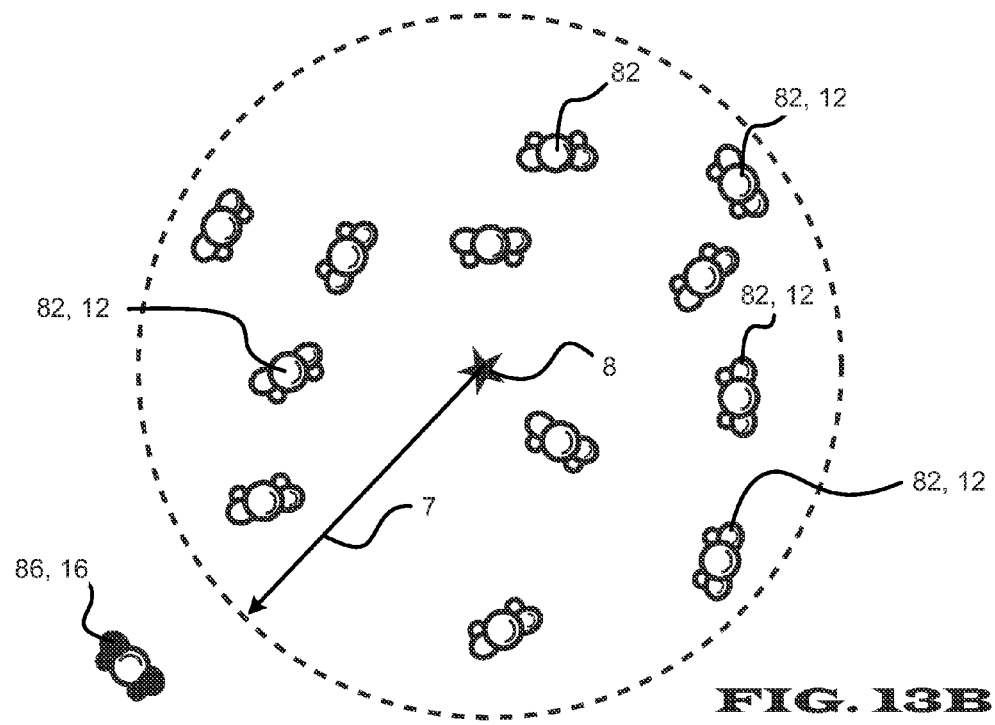

The notification manager 20 can further determine a distance between the first user and the coordinate and alert the first user if the distance between the coordinate and the first user exceeds another predetermined threshold. For example, referring to FIGS. 13A and 13B, a group of registered monitored users 82 carrying mobile devices 12 are monitored by a monitoring user 86 carrying a mobile client device 16 via the location notification manager 20. A first centroid 6 is determined by the mapping engine 36 based on the positions of users 82 at a first time period shown by FIG. 13A, and a second centroid 8 is determined by the mapping engine 36 based on user positions at a later second time period shown by FIG. 13B. In FIG. 13A during the first time period, the monitoring user 86 is shown within a predetermined distance 7 of the centroid 6. In FIG. 12B during the second time period, the monitoring user 86 is shown removed greater than the predetermined distance 7 from the centroid 8 causing an alert to be triggered by the notification manager 20 and delivered to the monitoring user 86 via the client device 16.

In an example implementation of the method 500, a parent user is notified when one or more of a group of children under her care veers away a predetermined distance from the group as defined by a coordinate based on positions of the children, or whether the group as defined by the coordinate veers away a particular distance from the parent.

Figure 7:
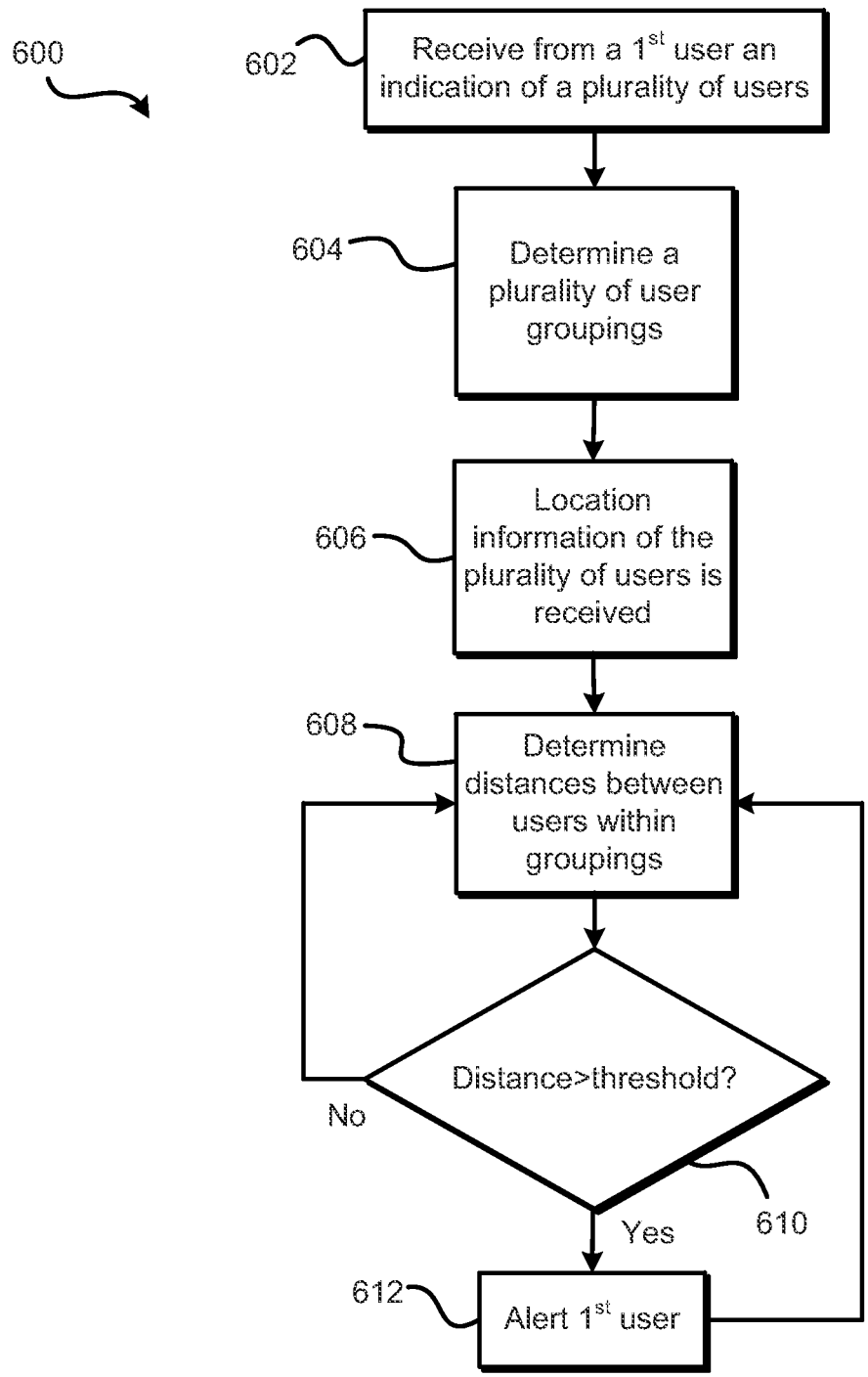

Referring to FIG. 7, a method 600 for providing an alert based on user location is shown. The method 600 is described with reference to the components shown in the system 10 of FIG. 1, including the notification manager 20 and monitoring agent 13, which are preferably configured for performing the method 600 and include or have access to suitable non-transitory data storage including instructions for performing the method. The method 600 may alternatively be performed via other suitable systems. The notification manager 20 receives from a first user an indication of a plurality of users including at least three users (step 602) via the configuration application 22. A plurality of groupings of the plurality of users are determined via the linking engine 27, wherein each grouping includes at least two of the plurality of users (step 604). If the first user is authorized, for example as described above in method 300 with reference to steps 304, 306, 308, 310 and 320, location information of the plurality of users is received (step 606), for example using the monitoring API 24 via the monitoring agent 13 executed on the mobile device 12. One or more distances are determined between users in each of the plurality of groupings based on the location information of the plurality of users (step 608), for example via the mapping engine 36. The first user is alerted responsive to the distance between two or more users in a grouping exceeding a predetermined threshold (steps 610, 612) via the alert interface 32. The notification manager 20 can further receive an indication of the plurality of groupings from the first user via the configuration application, and the linking engine 27 can determine one or more of the groupings from the indication of the plurality of groupings received from the first user. Referring to FIG. 11B, an example alert 64 pursuant to the method 600 for a group of children including Billy and Sally reads "Billy has exceeded 100 yards from Sally", as shown on a screen display 60 of a caretaker's client device 16.

In an example implementation of the method 600, a caretaker of a plurality of children is assisted in determining during an outing whether or not each child under the caretaker's care stays near the other member or members in his or her respective designated child group. The caretaker is enabled via the configuration application 22 to provide an indication of a group of two or more children (e.g. a "buddy pair") which is a selection of which children are grouped together in a particular group.

Figure 8:
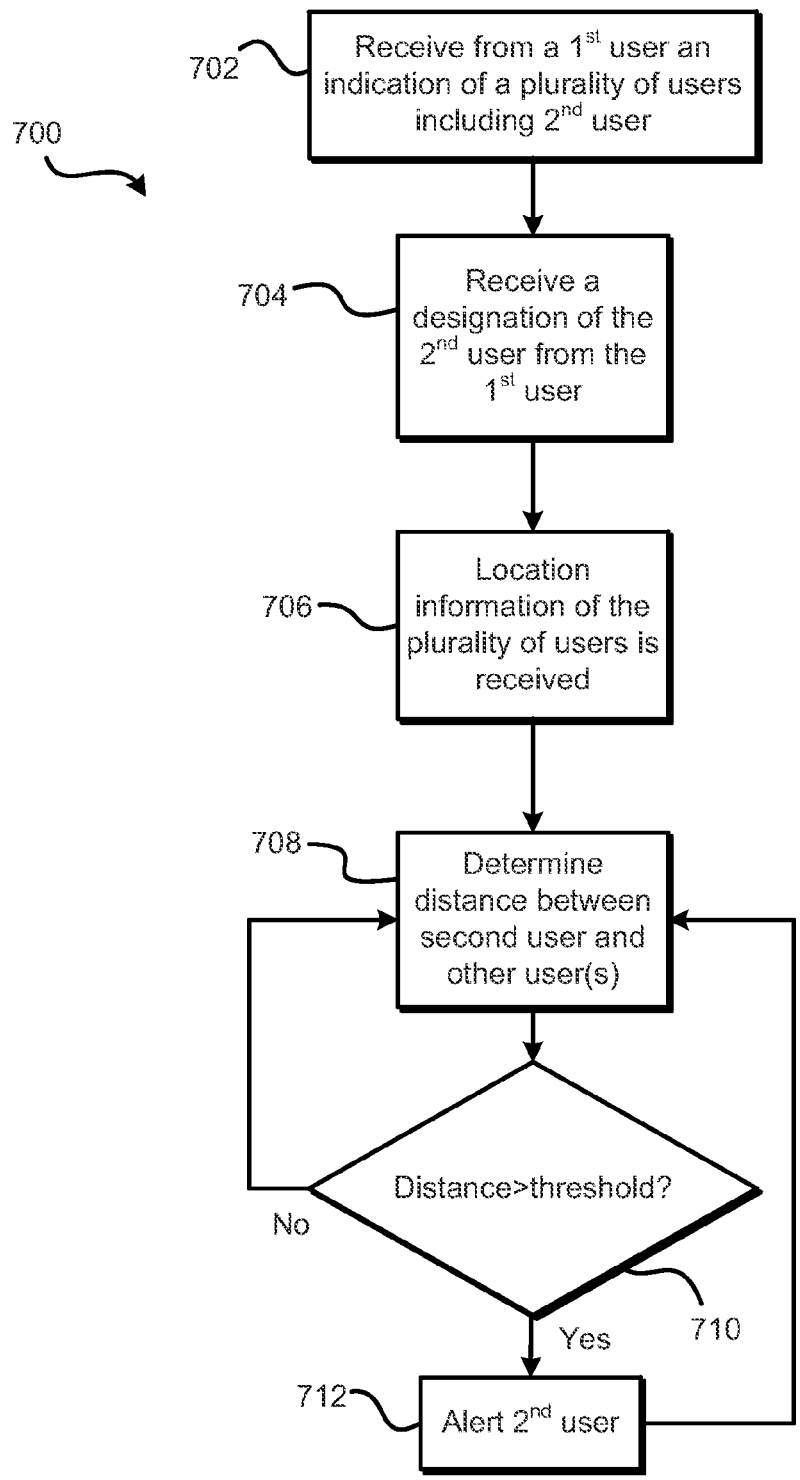

Referring to FIG. 8, a method 700 for providing an alert based on user location is shown. The method 700 is described with reference to the components shown in the system 10 of FIG. 1, including the notification manager 20 and monitoring agent 13, which are preferably configured for performing the method 700 and include or have access to suitable non-transitory data storage including instructions for performing the method. The method 700 may alternatively be performed via other suitable systems. The notification manager 20 receives from a first user an indication of a plurality of users including at least second and third users (step 702) and a designation of at least the second user (step 704) via the configuration application 22. If the first user is authorized, for example as described above in method 300 with reference to steps 304, 306, 308, 310 and 320, location information of the plurality of users is received (step 706), for example using the monitoring API 24 via the monitoring agent 13 executed on the mobile device 12. Distance is determined between the second user and each of the other plurality of users based on the location information, for example via the mapping engine 36 (step 708). The second user is alerted via the alert interface 32 responsive to the designation and responsive to the distance between the second user and at least one other of the plurality of users exceeding a predetermined threshold (step 710, 712). Further, the first user can be alerted responsive to the distance between the second user and one of the plurality of users exceeding a predetermined threshold. In such case the first user is not required to carry a mobile communication device. Further, in any of the previously described methods in which a plurality of users are monitored by the first user, the first user can designate one a plurality of users to receive the alert in addition to or instead of the first user. For example, a caretaker can designate the mobile device of her older son as a parent device and designate the mobile devices of her son's two friends and her younger daughter as monitored child devices. The son goes on a bicycle ride with a group including the two friends and the daughter. When the daughter exceeds a predetermined distance from the son, or alternatively from the two friends, or alternatively from a coordinate defined by the positions of each person in the group, an alert is transmitted to the son's mobile device and to the caretaker's mobile device.

Figure 9:
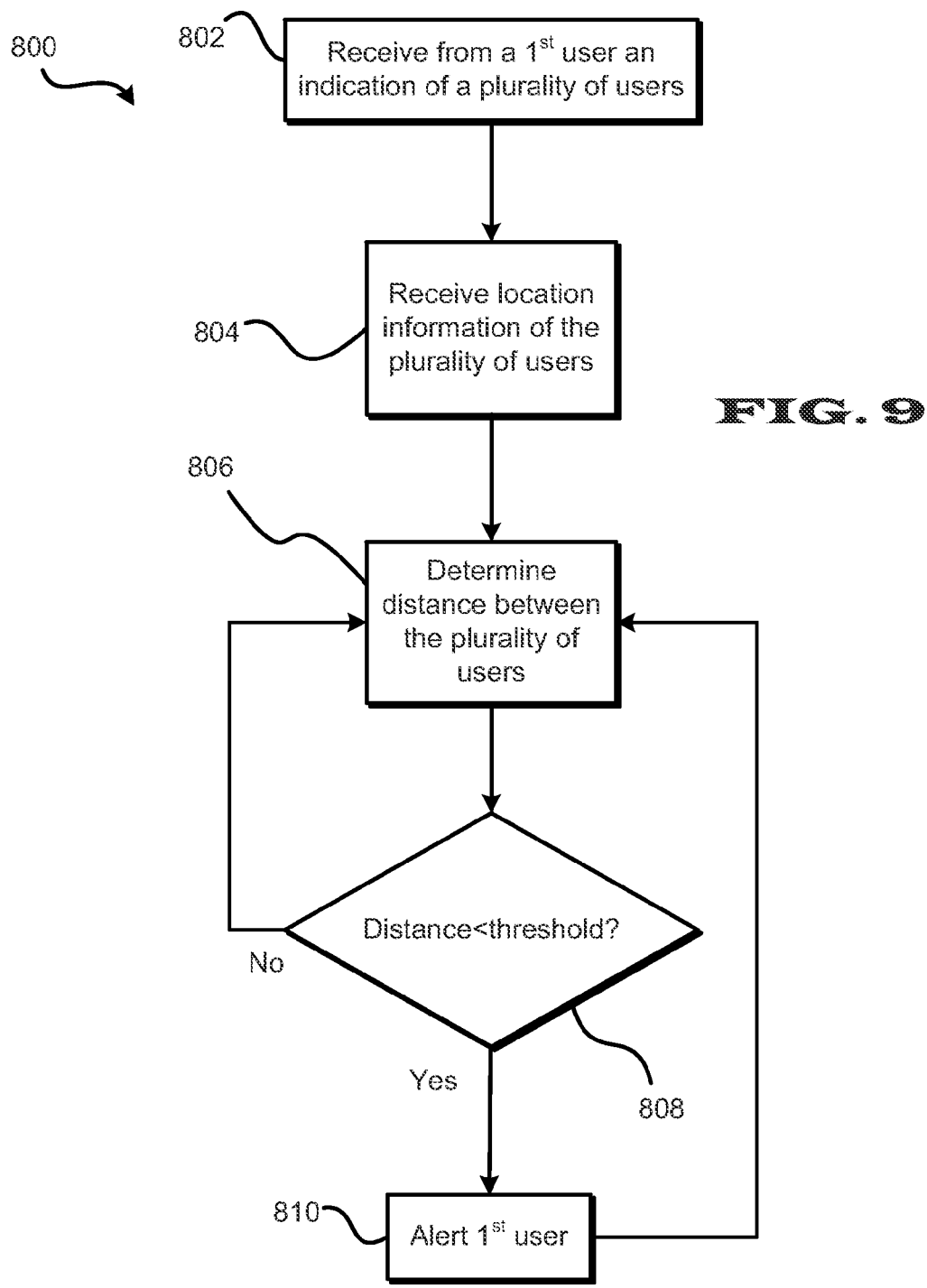
Figure 11F:
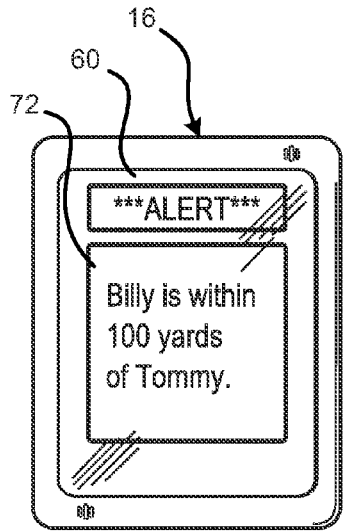

Referring to FIG. 9, a method 800 for providing an alert based on user location is shown. The method 800 is described with reference to the components shown in the system 10 of FIG. 1, including the notification manager 20 and monitoring agent 13, which are preferably configured for performing the method 800 and include or have access to suitable non-transitory data storage including instructions for performing the method. The method 800 may alternatively be performed via other suitable systems. The notification manager 20 receives from a first user an indication of a plurality of users (step 802) via the configuration application 22. If the first user is authorized, for example as described above in method 300 with reference to steps 304, 306, 308, 310 and 320, location information of the plurality of users is received (step 804), for example using the monitoring API 24 via the monitoring agent 13 executed on the mobile device 12. At least one distance is determined between the plurality of users based on the location information of the plurality of users (step 806), for example via the mapping engine 36. The first user is alerted via the alert interface 32 responsive to the distance between at least one of the plurality of users and at least one other of the plurality of users being less than a predetermined threshold (steps 808, 810). For example, a caretaker may be aware that two particular children are prone to physical conflict with each other and would like to be alerted when there is a possibility of an interaction between them. Implementing the method 800, the notification manager 20 can provide the caretaker with an alert when the children become too close together. Referring to FIG. 11F, an example alert 72 pursuant to the method 800 for children named Billy and Tommy may read "Billy is within 100 yards of Tommy", as shown on a screen display 60 of a caretaker's client device 16.

Referring to FIG. 10, a method 900 for providing an alert based on user motion states is shown. The method 900 is described with reference to the components shown in the system 10 of FIG. 1, including the notification manager 20 and monitoring agent 13, which are preferably configured for performing the method 900 and include or have access to suitable non-transitory data storage including instructions for performing the method. The method 900 may alternatively be performed via other suitable systems. The notification manager 20 receives from an indication of a plurality of users (step 902) via the configuration application 22. The indication can be received from a monitoring user. If the monitoring user is authorized, for example as described above in method 300 with reference to steps 304, 306, 308, 310 and 320, location information and/or acceleration information of the plurality of users is received (step 904), for example using the monitoring API 24 via the monitoring agent 13 executed on the mobile device 12. User motion states of the plurality of users are determined based on the location information and/or acceleration information of the plurality of users (step 906), for example via the classification engine 36. A user motion state corresponds for example to a determination that a user is walking, riding a bicycle, or riding in a motor vehicle. An alert is provided, for example to the monitoring user, via the alert interface 32 responsive to the user motion state of at least one of the plurality of users differing from the user motion state of at least one other of the plurality of users (steps 908, 910). For example, an alert is generated when the determined user motion state for one user corresponds to walking, while the determined user motion state for the remaining plurality of users corresponds to bicycling.

The above-referenced computing system implemented methods have numerous applications including the following non-limiting examples. Parents may be notified when one of their small children wanders away from them when on a trip to the mall or park. Older children or teens may be permitted to travel by themselves away from a parent so long as they remain near a particular friend or group of friends, and a notification is provided to the parent when they wander away from such friend or friends. Caretakers of developmentally disabled persons may be notified when such persons wander away from the group during an outing.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method of providing an alert based on user location comprising:
    receiving from a first user an indication of a second user;
    determining whether the first user and the second user are co-members of a telecommunication carrier service plan;
    transmitting a request to at least one of the second user and a party authorized to respond on behalf of the second user for authorization to access location information of the second user responsive to determining that the first user and the second user are not co-members of a telecommunication carrier service plan;
    receiving location information of the first user and location information of the second user;
    determining a distance between the first user and the second user based on the location information of the first user and the location information of the second user; and
    alerting the first user responsive to the distance between the first user and the second user exceeding a predetermined threshold;
    wherein at least one of the steps of receiving the location information, determining a distance, and alerting the first user are responsive to receiving authorization.

2. The computer-implemented method of claim 1, further comprising:
    receiving from the first user an indication of a plurality of users;
    receiving location information of the plurality of users;
    determining a distance between the first user and the plurality of users based on the location information of the first user and the location information of the second user; and
    alerting the first user responsive to the distance between the first user and at least one of the plurality of users exceeding a predetermined threshold.

3. A computer-implemented method of providing an alert based on user location comprising:
    receiving from a first user an indication of a second user;

determining whether the first user and the second user are co-members of a telecommunication carrier service plan;

responsive to determining that the first user and the second user are not co-members of a telecommunication carrier service plan, transmitting a request to at least one of the second user and a party authorized to respond on behalf of the second user for an authorization to access location information of the second user;

receiving the authorization to access the location information of the second user from at least one of the second user and the party authorized to respond on behalf of the second user;

receiving location information of the second user responsive to receiving the authorization;

comparing the location information of the second user and location information of another user to determine a relative position of the second user with respect to the other user; and alerting the first user based on the relative position.

4. The computer-implemented method of claim 3, wherein the other user is the first user, wherein the first user is alerted when the second user exceeds a predetermined distance from the first user.

5. The computer-implemented method of claim 3, wherein the other user is a third user, wherein at least one of the first user and the third user is alerted when the second user exceeds a predetermined distance from the third user.

6. A computer-implemented method of providing an alert, comprising:

receiving from a first user an indication of a second user, a third user, and a fourth user;

determining whether the first user and at least the second user are co-members of a telecommunication carrier service plan;

responsive to determining that the first user and the second user are not co-members of a telecommunication carrier service plan, requesting authorization from at least one of the second user and a party authorized to respond on behalf of the second user;

receiving requested authorization;

following receipt of requested authorization receiving location information of at least the second user;

determining distances between the first user and at least the second user based on received location information; and alerting the first user responsive to the determination that the distance exceeds a predetermined threshold.

7. The computer-implemented method of claim 6, wherein the first user is alerted responsive to a distance between the second user and at least one of the third user and fourth user exceeding the predetermined threshold.

8. A computer-implemented method of providing an alert based on user location comprising:

receiving from a first user an indication of at least a second user and a third user;

determining whether the first user and at least the second user are co-members of a telecommunication carrier service plan;

responsive to determining that the first user and the second user are not co-members of a telecommunication carrier service plan, requesting authorization to obtain location information of the second user;

after receiving authorization determining distances between the second user and the third user; and alerting the first user responsive to the distance between any of the at least the second user and the third user exceeding a predetermined threshold.

9. A computer-implemented method providing an alert based on user location comprising:

receiving from a first user an indication of at least second user and a third user;

determining whether the first user and at least the second user are co-members of a telecommunication carrier service plan;

responsive to determining that the first user and the second user are not co-members of a telecommunication carrier service plan, transmitting a request to at least one of the second user and a party authorized to respond on behalf of the second user for an authorization to access location information of the second user;

receiving authorization to access the location information of the second user from at least one of the second user and the party authorized to respond on behalf of the second user;

receiving location information including geographic positions of the at least the second user and the third user, wherein location information corresponding to at least the second user is received responsive to receiving the authorization;

determining a coordinate based on the geographic positions of the at least the second user and the third user;

determining distances between the coordinate and the at least the second user and the third user; and alerting the first user responsive to the distance between the coordinate and at least one of the second user and the third user exceeding a predetermined threshold.

10. The method of claim 9, further comprising determining the coordinate as a centroid of the geographic positions of the at least the second user and the third user.

11. The method of claim 9, further comprising:

determining a distance between the first user and the coordinate;

alerting the first user responsive to the distance between the coordinate and the first user exceeding another predetermined threshold.

12. A computer-implemented method of providing an alert based on user location comprising:

receiving from a first user an indication of a second user, a third user, and a fourth user;

determining whether the first user and at least the second user are co-members of a telecommunication carrier service plan;

responsive to determining that the first user and the second user are not co-members of a telecommunication carrier service plan, requesting authorization from at least one of the second user and a party authorized to respond on behalf of the second user;

receiving requested authorization;

following receipt of requested authorization receiving location information of at least the second user;

determining a plurality of groupings of the second user, third user and fourth user, wherein each grouping comprises at least two of the users;

determining at least one distance between users in each of the plurality of groupings based on the location information of the second user, third user, and fourth user; and alerting the first user responsive to the distance between at least two users in a grouping exceeding a predetermined threshold.

13. The computer-implemented method of claim 12, further comprising:

receiving an indication of the plurality of groupings from the first user; and determining at least one of the plurality of groupings from the indication of the plurality of groupings received from the first user.

14. A computer-implemented method of providing an alert based on user location comprising:
- receiving from a first user an indication a second user and a third user;
- receiving from the first user a designation of the second user;
- determining whether the first user and the third user are co-members of a telecommunication carrier service plan;
- responsive to determining that the first user and third user are not co-members of a telecommunication carrier service plan requesting authorization from at least one of the third user and a party authorized to respond on behalf of the third user;
- receiving location information of the second user and the third user, wherein the location of at least the second user is received after receiving requested authorization;
- determining a distance between the second user and the third user based on the location information; and
- alerting the second user responsive to the designation and responsive to the distance between the second user and the third user exceeding a predetermined threshold.

15. The method of claim 14, further comprising:
- receiving from the first user an indication of at least the third user and a fourth user;
- determining a distance between the second user and each of the third user and the fourth user; and
- alerting the second user responsive to the designation and responsive to the distance between the second user and any one of the third user and the fourth user exceeding a predetermined threshold.

16. The method of claim 14, further comprising alerting the first user responsive to the distance between the second user and the third user exceeding a predetermined threshold.

17. A computer-implemented method of providing an alert based on user location comprising:
- receiving from a first user an indication of at east a second user and a third user;
- determining whether the first user and the second user are co-members of a telecommunication carrier service plan;
- responsive to determining that the first user and the second user are not co-members of a telecommunication carrier service plan, requesting from at least one of the second user and a party authorized to respond on behalf of the second user;
- receiving location information of the second user and third user after authorization is received;
- determining at least one distance between the second user and third user based on the location information; and
- alerting the first user responsive to the distances between at least one of the second user and the third user being less than a predetermined threshold.

18. A computer-implemented method of providing an alert based on user motion states comprising:
- receiving an indication of at least a second user and a third user;
- determining whether a first user and the second user are co-members of a telecommunication carrier service plan;
- responsive to determining that the first user and the second user are not co-members of a telecommunication carrier service plan, requesting authorization from at least one of the second user and a party authorized to respond on behalf of the second user;
- after receiving authorization, receiving at least one of location information and acceleration information of the second user and the third user;
- determining user motion states of the second user and the third user based on the at least one of the location information and the acceleration information of the second user and third user; and
- providing an alert responsive to the user motion state of at least the second user differing from the user motion state of the third user.

19. The computer implemented method of claim 18, wherein the user motion states correspond to at least one of walking, bicycling, and riding in a motor vehicle.

20. The computer implemented method of claim 18, further comprising:
- receiving the indication of the second user and third user from a first user; and
- providing the alert to the first user.

21. A system comprising a non-transitory computer readable storage medium having encoded thereon instructions that, when executed on a processor of the system, cause the system to perform a process including:
- receiving from a first user an indication of a second user;
- determining whether the first user and the second user are co-members of a telecommunication carrier service plan;
- transmitting a request to at least one of the second user and a party authorized to respond on behalf of the second user for an authorization to access location information of the second user responsive to determining that the first user and the second user are not co-members of a telecommunication carrier service plan;
- receiving location information of the first user and location information of the second user;
- determining a distance between the first user and the second user based on the location information of the first user and the location information of the second user; and
- alerting the first user responsive to the distance between the first user and the second user exceeding a predetermined threshold;
- wherein at least one of the steps of receiving the location information, determining the distance, and alerting the first user are performed responsive to receiving authorization from the at least one of the second user and the party authorized to respond on behalf of the second user.

22. Non-transitory computer-readable media tangibly embodying a program of instructions executable by a computing device to implement a method, the computing device being capable of interfacing with a communications network, the method comprising:
- receiving from a first user an indication a second user and a third user;
- receiving from the first user a designation of the second user;
- determining whether the first user and the third user are co-members of a telecommunication carrier service plan;
- responsive to determining that the first user and the third user are not co-members of a telecommunication carrier service plan requesting authorization from at least one of the third user and a party authorized to respond on behalf of the third user;
- after receiving authorization receiving location information of the second user and the third user;

determining a distance between the second user and the third user based on the location information; and alerting the second user responsive to the designation and responsive to the distance between the second user and the third user exceeding a predetermined threshold.

* * * * *

UNITED STATES PATENT AND TRADEMARK OFFICE
CERTIFICATE OF CORRECTION

PATENT NO. : 8,983,435 B2  
APPLICATION NO. : 13/647336  
DATED : March 17, 2015  
INVENTOR(S) : Andrew Weiss Page 1 of 1

It is certified that error appears in the above-identified patent and that said Letters Patent is hereby corrected as shown below:

IN THE CLAIMS

At Column 15 line 42, delete the word "east" and insert therefor --least--.

At Column 15 line 49, between the words "requesting" and "from" insert therefor --authorization--.

Signed and Sealed this  
Tenth Day of May, 2016

Michelle K. Lee  
*Director of the United States Patent and Trademark Office*